May 4, 1954      W. K. HRUSHOW      2,677,446
COMBINED BRAKE AND ACCELERATOR FOR VEHICLES
Filed Jan. 22, 1951      3 Sheets-Sheet 1
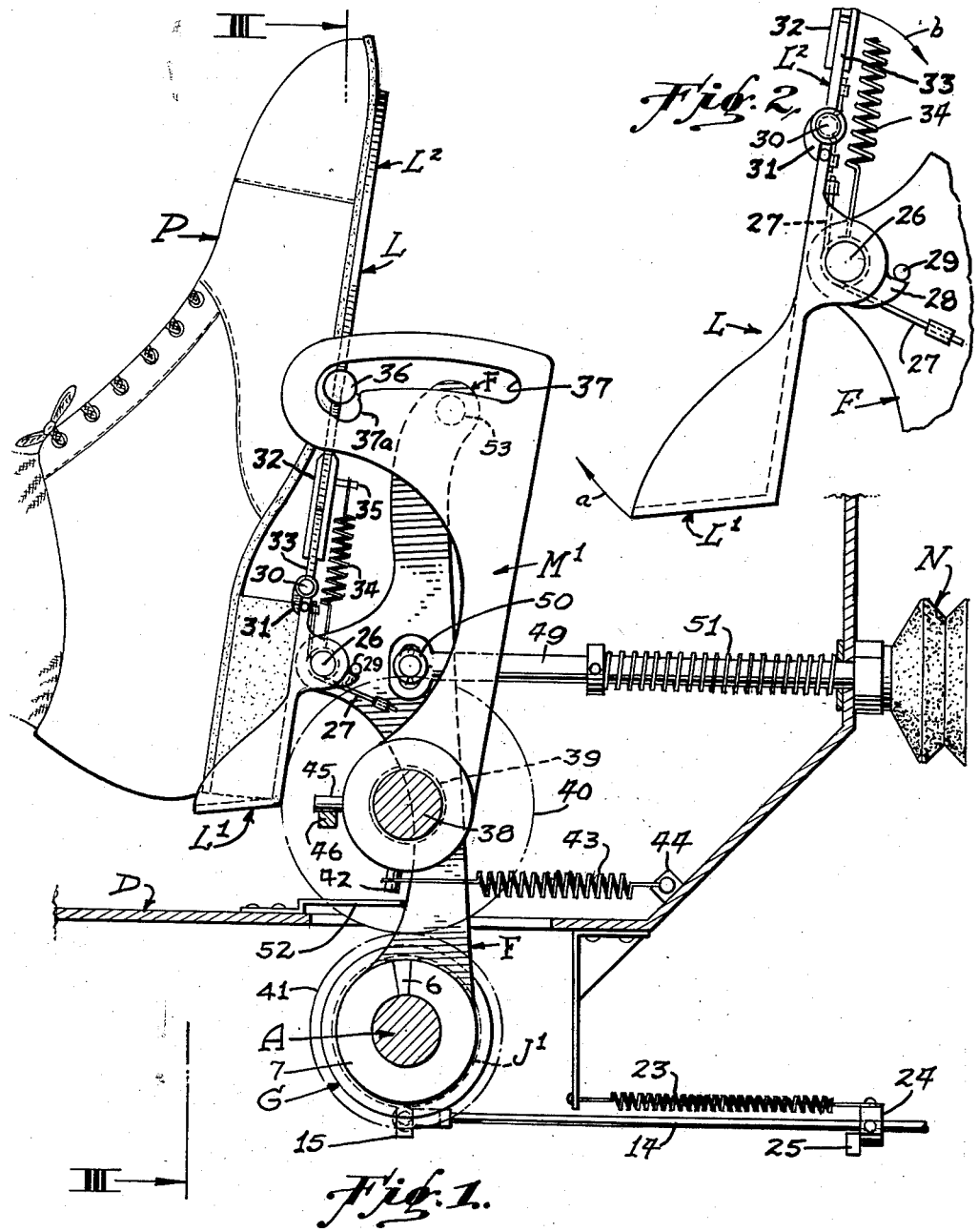
INVENTOR.
WECHESLAV K. HRUSHOW
BY
Munn, Liddy & Glaccum
ATTORNEYS May 4, 1954 W. K. HRUSHOW, 2,677,446
COMBINED BRAKE AND ACCELERATOR FOR VEHICLES
Filed Jan. 22, 1951 3 Sheets-Sheet 2
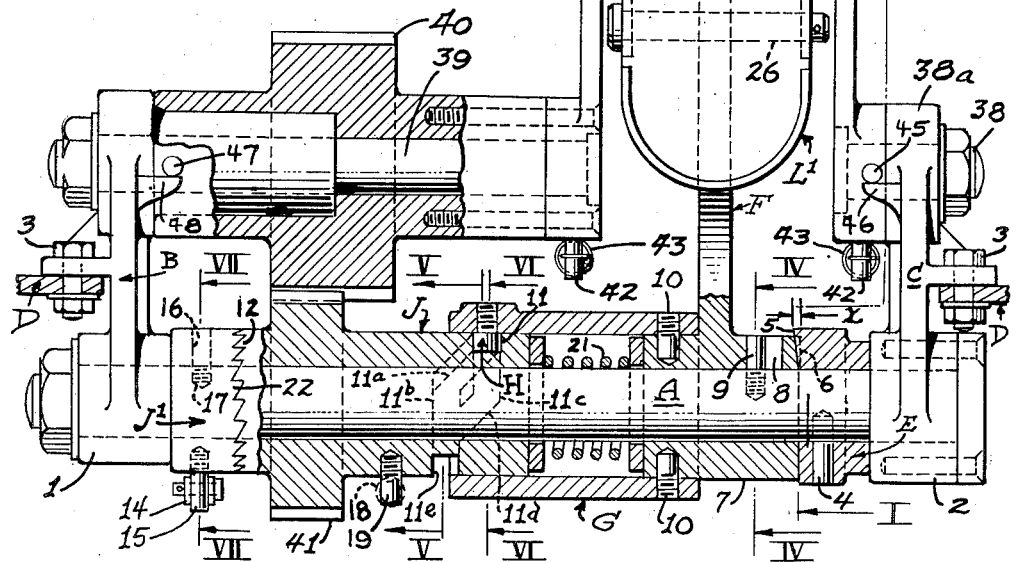
INVENTOR.
WECHESLAV K. HRUSHOW
BY
Munn, Liddy & Glaccum
ATTORNEYS

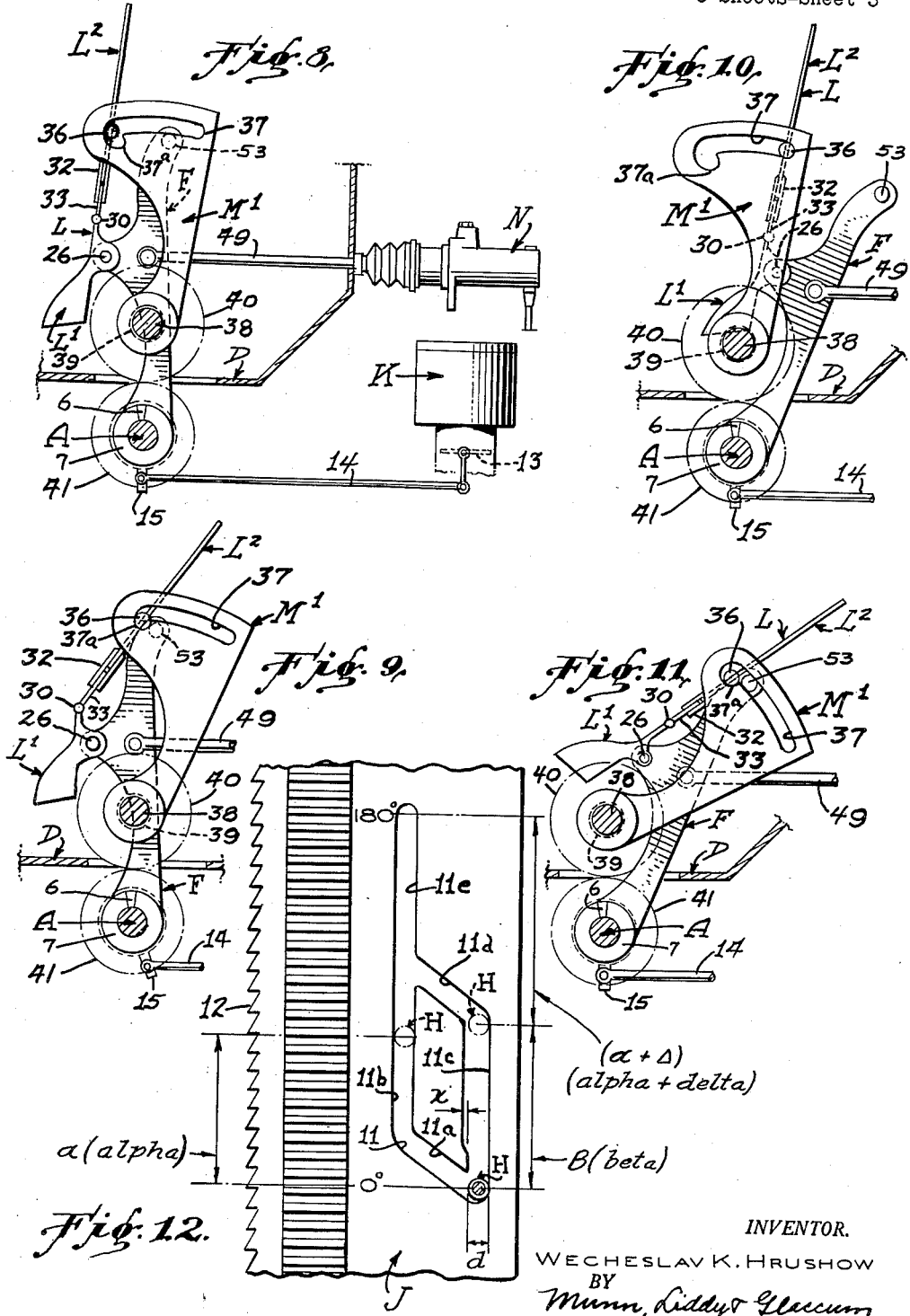

Patented May 4, 1954

2,677,446

UNITED STATES PATENT OFFICE 2,677,446

COMBINED BRAKE AND ACCELERATOR FOR VEHICLES

Wecheslav K. Hrushow, Monterey, Calif.

Application January 22, 1951, Serial No. 207,166

6 Claims. (Cl. 192—3)

An object of my invention is to provide a combined brake and accelerator for vehicles in which a single articulated foot pedal is operatively connected to the brake and gas control units of a vehicle so that the operator can control the movement and stopping of the vehicle with one foot.

It is well known that when a driver is faced with an emergency, there is an appreciable lapse of time known as "thinking time," before he can carry out the proper movement either to accelerate the car or bring it to a quick stop. Many accidents happen because of this "thinking time" which must intervene between the time the emergency presents itself and the time the driver acts. It is also well known that many drivers when faced with an emergency, lose their heads and instinctively and instantly jamb their foot down upon the pedal that is already being contacted. Usually this pedal is the accelerator and a further depressing of the pedal will speed up the car and make the accident infinitely worse than it otherwise would have been if the brake pedal were depressed and the accelerator pedal freed.

Since my device makes use of a single articulated pedal for actuating either the accelerator or the brake, the time it usually takes for the operator to transfer his foot from one pedal to another, where separate pedals are used, is obviated. Moreover, there are four possible actions which a driver may take when facing an emergency and my device is designed to automatically cut off the gas to the vehicle engine and apply the brakes of the vehicle regardless of which one of the four actions the driver instinctly carries out. These four possible actions will be set forth hereinafter.

Other objects and advantages will appear in the following specification, and the novel features of the device will be particularly pointed out in the appended claims.

My invention is illustrated in the accompanying drawings forming a part of this application, in which:

Figure 1 is a section along the line I—I of Figure 3;

Figure 2 is an enlarged portion of the combined brake and accelerator articulated pedal;

Figure 3 is a section taken along the line III—III of Figure 1;

Figures 4, 5, 6 and 7 are transverse sections taken along the lines IV—IV, V—V, VI—VI and VII—VII of Figure 3;

Figure 8 is a view similar to Figure 1 and shows the parts in normal position;

Figure 9 illustrates the movement of the parts which take place when the device is used for accelerating the vehicle;

Figure 10 illustrates the movement of the parts when the device is used for applying the brake to the vehicle;

Figure 11 illustrates the position of the parts when the articulated foot pedal has been moved farther in an emergency, the device applying the brake and permitting the butterfly valve of the carburetor of the engine to close; and Figure 12 is a development view of one of the members of the device.

While I have shown only the preferred form of my invention, it should be understood that the various changes or modifications may be made within the scope of the appended claims without departing from the spirit and scope of the invention.

In carrying out my invention, I provide a stationary shaft A and this shaft is mounted in bearings 1 and 2, see Figure 3. The bearings in turn are supported in brackets B and C and the brackets may be secured to the floor board D of a vehicle by means of bolts 3 or other suitable fastening means.

A cam E is mounted on the shaft A and is held against movement by a pin 4. This cam has a cam tooth 5 that contacts with a second cam tooth 6 provided on a hub 7 of a swingable brake arm F. Figure 4 illustrates the hub 7 as having an arcuate slot 8 therein and a pin 9 is slidably received in the slot and limits the angular movement of the brake arm F about the shaft A as a pivot. The particular construction of the brake arm F and its function will be described hereinafter.

Again referring to Figure 3, it will be seen that the hub 7 has a cylindrical member G secured thereto by pins 10 that are passed through the wall of the member and enter the hub 7. The structure is such that an angular movement of the brake arm F will rotate the cylindrical member G through an arc corresponding to the movement of the arm. The cylinder G carries a cam follower roller H and this roller is slidably received in a cam groove 11 provided in a clutch member J.

The clutch member J is cylindrical and is rotatably mounted on the shaft A. The clutch member is provided with a plurality of clutch teeth 12, see Figure 3, that extend in a direction for connecting the member J to a second clutch member J1 when the member J is rotated in a counter-clockwise direction when looking at Figure 1. The member J1 is connected to a butterfly valve 13 of a carburetor K, see Figure 8, by means of a link or rod 14, see Figure 7. The link has its other end connected to a pin 15, see Figure 3. Figure 7 also shows the clutch member J1 provided with a slot 16 and a pin 17 is slidably received in the slot and is carried by the shaft A. The purpose of the pin 17 is to prevent the member J1 from moving longitudinally along the shaft while permitting rotative movement of the clutch member J1. Both Figures 3 and 5 illustrate a coil spring 18 connected at one end to a pin 19 which in turn is carried by the clutch member J. The purpose of this spring is to hold the pin 19 against a stop 20, see Figure 5, and this will return the clutch member J to the position shown in Figures 3 and 5. The clutch member J can rotate in a counter-clockwise direction when looking at Figure 5 for a purpose which will be described later.

The parts described thus far are acted upon when the brake arm F is swung in a clockwise direction when looking at Figure 4. This movement will cause the cam tooth 6 on the hub 7 to ride over the cam tooth 5 on the stationary cam E, and to move the hub 7 longitudinally to the left in Figure 3. The movement will cause the cylindrical member G to shift the cam follower roller H to the left in Figures 3 and 12 and thus place the cam follower roller H in the cam groove portion 11a forming a part of the cam groove 11 in the clutch member J.

The movement of the roller H along the cam groove passage 11a will cause a portion of the clutch member J to telescope within the cylindrical member G and to compress a compression spring 21. The pin 9 prevents movement of the hub 7 to the left along the shaft A as soon as the pin strikes the right hand wall of the slot 8. The telescoping of a portion of the clutch member J within the cylindrical member G will cause the clutch teeth 12 to become disengaged from the complementary clutch teeth 22 provided on the second clutch member J1. As soon as the clutch members J and J1 are separated from each other, a spring 23 connected to the link 14, see Figures 1 and 8, will move the link to the left in these figures and will cause the pin 15 to return the second clutch member J1 to normal position. The link 14 will therefore close the butterfly valve 13 and when this takes place, a clamp 24 secured to the link 14 will strike a stop 25 and prevent further movement. In this way the accelerator portion of the device comprising the second clutch member J1 and associated parts will be freed by the initial swinging of the brake arm F and the gas to the engine will be cut off before the brake arm F is moved far enough to apply the brake.

It may be best at this time to describe the structure of the single articulated pedal L which is used for actuating either the brake arm F or an accelerator arm M, see Figure 3. In Figure 1, I show the articulated pedal L as having a heel portion L1 pivotally mounted at 26 to the brake arm F. The heel portion L1 is shown in enlarged detail in Figure 2. The heel portion is maintained in the normal position shown in both Figures 1 and 2 by means of a coil spring 27 that tends to rotate the heel portion L1 in a counter-clockwise direction so that a projection 28 will be yieldingly held against a stop 29 mounted on the brake arm F. The heel portion L1 can be manually rotated in a clockwise direction about the pivot 26 by the driver's foot as indicated by the arrow a in Figure 2 for a purpose hereinafter described.

The upper portion L2 of the articulated pedal L is pivotally connected to the heel portion L1 by a hinge 30, see Figures 1 and 2. A torsional spring mounted on the hinge 30 (see Figure 2) tends to swing the upper portion L2 of the pedal in a counter-clockwise direction and this will keep lugs 31 carried by the upper pedal portion L2 in contact with the lower portion L1, with the result that the upper and lower portions L1 and L2 will normally lie in the same plane. It is possible, however, to manually swing the upper portion L2 about the hinge 30 in the direction of the arrow b shown in Figure 2 when the driver uses his foot.

It is also necessary that the upper portion L2 have a telescoping member 32 that slides with respect to a member 33, the latter member being secured to the heel portion L1 by the hinge 30. A coil spring 34, see Figure 2, is connected to a pin 35, see Figure 1, that in turn is carried by the telescoping member 32. The other end of the coil spring 34 is attached to the pin 26 and yieldingly holds the member 32 in its lowermost position with respect to the member 33. The purpose for this will be presently set forth. Figure 3 illustrates laterally projecting pins 36 carried by the member 32 and projecting beyond the sides thereof, and Figure 1 illustrates these pins as being receivable in arcuate slots 37 provided in the accelerator arms M and M'. The slots 37 have recess portions 37a disposed at the left hand ends of the slots. When the upper pedal portion L2 is caused to pivot at 26, the pins 36 will be moved into the recesses 37a for a purpose presently to be described.

In Figure 3 it will be noted that the right hand accelerator arm M1 is pivotally mounted on a shaft 38 mounted in a bearing 38a and this accelerator arm performs no real function in the operation of the device except to balance the movement of the other accelerator arm M. The accelerator arm M is rotatably mounted on a stub shaft 39 and is connected to a gear 40 that is in mesh with a gear 41 that forms a part of the clutch member J. A rearward swinging movement of the accelerator arm M will rotate the gear 40 in the same direction and will cause the gear 41 to rotate in the opposite direction. When the clutch members J and J1 are connected to each other, this opposite rotation of the gear 41 will rotate the clutch member J1 and through the link 14 will cause the butterfly valve 13 to open. In this way the vehicle engine is accelerated in speed.

The accelerator arms M and M1 carry pins 42, see Figure 3, that are connected by coil springs 43 to fixed supports 44, so that a freeing of the accelerator arms M and M1 will permit the springs 43 to return these arms to the position shown in Figure 1. The arm M1 has a projection 45 that strikes a stop 46 for holding the accelerator arm M1 in the position shown in Figure 1. In like manner the other accelerator arm M has a projection 47 mounted on an extension of the gear 40 and adapted to contact a stop 48 for holding the arm M in the same position as the arm M1.

Before describing the operation of the invention, it is best to state that the master brake cylinder N shown in Figure 8 has a piston rod 49 connected directly to the brake arm F by means of a pivot pin 50. A coil spring 51, see Figure 1, is mounted on the rod 49 and urges the rod to the left in this figure. A stop 52 carried by the floor board D of the vehicle contacts with the brake arm F and prevents further swinging movement of the arm to the left in Figure 1.

The cylindrical portion of the clutch member J is provided with the cam groove 11 as shown in Figures 3 and 12 and this groove has an inclined passage or branch 11a, and it also has a circumferentially extending branch 11b in which the roller H rides when the vehicle brake is being applied. It will also be seen from both Figures 3 and 12 that the groove 11 has another branch 11c which receives the roller H when the car is being accelerated. The branch 11c merges into an inclined branch 11b. It will further be noted that the branch 11c has a portion which is widened to the extent of the distance X shown in Figure 12. This distance corresponds to the distance the cam teeth 5 and 6 will move the hub 7 to the left in Figure 3 during the initial swinging movement of the brake arm F. In Figure 5 I show the branches 11a, 11b and 11e of the groove, while in Figure 6 I show the branches 11c and 11d.

From the foregoing description of the various parts of the device, the operation thereof may be readily understood.

Assume that the parts are in the position shown in Figures 1 and 8 and the driver wishes to accelerate the car; he presses upon the upper portion L2 of the pedal only and causes this portion to swing about the pivot 30 as indicated in Figure 9. This movement will cause the pins 36 to enter the recesses 37a of the slots 37 and to swing the accelerator arms M and M1. The swinging of the accelerator arm M about the shaft 39 will cause the gear 40 to rotate the gear 41 in a direction which will keep the teeth 12 on the clutch J in mesh with the teeth 22 on the clutch member J1. The result will be the rotation of the clutch member J1 and a swinging of the pin 15 into the position shown in Figure 9 and a movement of the rod 14 to open the butterfly valve 13 to the desired extent. The car will be accelerated and the speed of the car can be controlled by the operator's foot P swinging the upper portion L2 of the pedal to the desired extent.

It will be noted that a movement of the upper pedal portion L2 to rotate the gear 41 in a counter-clockwise direction when looking at Figure 9, will rotate the cylindrical portion of the clutch J in the same counter-clockwise direction. This will move the grooved portion 11c along the roller H and since this grooved portion lies in a plane that is at right angles with the axis of the shaft A, there will be no relative movement between the cylindrical member G and the clutch J.

If now the driver is faced with an emergency situation and has to apply the brake, he can let up on the upper pedal portion L2 and the accelerator arm M will return to normal position and the roller H will return to its starting position. The heel portion L1 can be pressed and the brake will be applied as stated.

If through the excitement of the emergency, the driver presses the upper pedal portion L2 still farther, the pedal portion L2 will be swung into the position shown in Figure 11. Figure 9 illustrates the maximum arc through which the pedal portion L2 can be swung without interfering with the brake arm F. Gradients of speed can be obtained by swinging the upper pedal portion L2 between the position shown in Figure 8 and that shown in Figure 9. In Figure 9 the pins 36 are shown contacting a pin 53 carried by the brake arm F. If, therefore, in the excitement of the emergency situation the driver swings the upper pedal portion L2 still further to the right as indicated in Figure 11, the brake arm F will be swung to the right about its shaft A.

The individual movement of the brake arm to the right in Figure 11 will cause the hub 7 to move to the left on the shaft A the distance indicated by the letter X in Figures 3 and 12. Inasmuch as the roller H is already in the grooved portion 11c, the roller H will merely be shifted against the left hand wall of this grooved portion. The swinging movement of the upper pedal portion L2 into the position shown in Figure 11 will continue to swing the brake arm F and this will rotate the cylindrical member G and cause the roller to travel along the grooved portion 11c and move on into the grooved portion 11d.

At the same time the further movement of the accelerator arm M will rotate the gears 40—41 so as to rotate the clutch J in the opposite direction to the path being taken by the roller H. These two movements which are reverse to each other, speed up the travel of the roller H from the branch 11c and cause it to pass through the branch 11d and into the extension 11e. While the roller is passing through the branch 11d, it will act to retract the clutch member J and disengage this member from the clutch J1. As soon as disengagement takes place between the two clutch members, the spring 23, see Figure 1, will move the rod 14 to close the butterfly valve and cut off any further flow of gas to the engine.

At the same time as the butterfly valve is closed, the brake arm F is being swung to the right as indicated in Figure 11 and will move the rod 49 to apply the brake. The driver will therefore automatically cut off the gas to the engine and will apply the brake even though under the excitement of the emergency he continues to press downwardly upon the upper brake pedal portion L2. This is one of the four possible actions of the driver mentioned in the objects of the specification.

Assume that the parts are in normal position as shown in Figure 8 and the operator wishes to apply the brakes. The heel portion L1 of the brake pedal is moved for this purpose as shown in Figure 10. During this movement the upper portion L2 will have its pins 36 slidably received in the arcuate slots 37 of the accelerator arms M and M'. The accelerator arm M will not be swung to actuate the throttle valve and therefore no gas will flow to the engine to accelerate it. The brake arm F, however, will be swung to the right as shown in Figure 10 and this will cause the hub 7 to shift to the left in Figure 3 a distance of the space X. This movement will cause the roller H to shift to the left in Figure 12 from the branch 11c to the entrance of the branch 11a. Further swinging movement of the brake arm F will cause the roller to travel along the branch 11a and to retract the clutch member J from its associated clutch member J1. The result is that the disengagement of the two clutch members will permit the spring 23 to close the butterfly valve 13. At the same time the brake arm F will move the piston rod 49 into the master cylinder N and apply the brakes, thereby bringing the vehicle to a stop.

In Figures 5, 6 and 12, I show the arcs through which the cam following roller H travels in the groove 11 when the device is used for bringing the vehicle to a stop and also when it is used for accelerating the vehicle. The alpha angle indicates in Figures 5 and 12 the arc through which the clutch member J is rotated when the roller H travels through the groove branches 11a and 11b during the applying of the brake. The beta angle indicates in Figures 6 and 12 the arc through which the clutch member J is rotated when the roller H travels through the groove branch 11c during the acceleration of the vehicle. In case the driver makes a mistake and continues to press on the portion L2 of the pedal L in an emergency when the roller H is already in the branch 11c, the roller H will be rotated in one direction by the cylinder G and the clutch member J will be rotated in the opposite direction by the gears 40 and 41. These combined angular movements are indicated in Figures 6 and 12 by the alpha plus delta angles. The roller H moves in the branches 11d and 11e.

The spring 51 for the brake arm F is far stronger than the springs 43 which tend to return the accelerator arms M and M1 to normal position and therefore the parts will assume their normal positions shown in Figure 1 when no foot pressure is brought to bear against the pedal L. When the driver presses the heel portion L2 to apply the brake, the pins 36 ride in the slots 37 in the accelerator members M and M1. The arcuate slots 37 have the axes of the shafts 38 and 39 as their centers while the pins 36 swing about the pivot 26 as a center. The pivot 26 moves with the brake arm F which swings about the shaft A as a center. The upper part L2 of the pedal L will be elongated to permit the pins 36 to ride in the slots 37 and the telescoping portion 32 will permit this movement.

In case of sudden danger and an emergency action by the driver, there are four different actions which he might perform. The first action is where the driver does not lose his capacity to think and to work quickly. He removes or releases his foot pressure on the upper pedal portion L2 and permits the gas to be shut off. He then presses on the heel portion L1 and applies the brake.

A second possible action is where the driver in an emergency forgets to release the gas pedal portion L2 and holds it while moving the heel portion L1 to apply the brake. The swinging of the brake arm F will free the clutch members J and J1 from each other and permit the gas to be shut off while the brake is applied.

A third possible action is where the driver in the emergency forgets to remove his foot from the gas pedal portion L2, but instead presses this portion still further. This results in the pedal portion L2 striking the brake arm F and swinging it with the same result as in the second action just mentioned in the preceding paragraph.

In the fourth action, the driver presses both the gas pedal portion L2 and the brake portion L1 with the result that the clutch members J and J1 will become disengaged, thereby shutting off the gas and applying the brake. The master brake cylinder N is connected to all brake cylinders, not shown, which apply the brakes to the vehicle wheels. When the clutch member J is rotated clockwise with respect to the other clutch member J1, the teeth 12 in the member J will ride out of the teeth 22 in the member J1.

The groove portion 11b in the member J in Figure 12, may be called the "brake" groove portion; the groove portion 11c may be called the "accelerator" groove portion; the groove portions 11a and 11d may be termed the first and second cam groove portions respectively; while the extension groove portion 11e may be designated the "extended brake" groove portion. The groove portions 11b and 11e lie in the same plane that extends at right angles to the axis of the shaft A and the groove portion 11c lies in a plane paralleling the first plane and spaced therefrom.

I have already stated that the portion L2 of the pedal can be elongated with respect to the portion L1 in order that the pins 36 be free to move in the slots 37 of the members M and M1. The reason for this will be seen when it is realized that the members M and M1 swing about the axes 38 and 39 while the pins 36 swing about the pivot 26 during the acceleration movement. The radius for the arcuate slots 31 is greater than the radius for the arc taken by the pins 36 about the pivot 26. Therefore the upper pedal portion L2 must elongate during its swinging movement to compensate for this difference.

I claim:

1. In a combined brake and accelerator for vehicles; a single articulated pedal having an upper portion hinged to a lower portion; a brake arm pivotally supporting the lower pedal portion; a vehicle brake operatively connected to the arm; and means for actuating the throttle valve of an engine and including a throttle arm having an arcuate slot therein and a recess placed at one end of the slot; the upper pedal portion having a pin slidable in the slot when the lower pedal portion is moved for actuating the brake arm for applying the brake, the throttle arm being unaffected by this movement; the upper pedal portion when swung about its hinge causing the pin to enter and strike the wall of the recess for swinging the throttle arm for opening the throttle valve and accelerating the engine.

2. In a combined brake and accelerator for vehicles; a single articulated pedal having an upper portion hinged to a lower portion; a brake arm pivotally supporting the lower pedal portion; a vehicle brake operatively connected to the arm; means for actuating the throttle valve of an engine and including a clutch member operatively connected to the valve; yielding means for urging the clutch member into a position for closing the valve; a second clutch member normally in engagement with the first mentioned clutch member; a throttle arm operatively connected to the second clutch member; the upper pedal portion being operatively connected to the throttle arm so that a movement of this portion about its hinge will actuate the throttle arm and through the clutch will open the valve to the desired extent; the brake arm lying in the path of and being contacted and swung by the upper pedal portion when this portion is moved beyond a predetermined point; and means operatively connecting the brake arm with the second clutch member for disengaging this member from the first clutch member during the initial movement of the brake arm caused by the excessive movement of the upper pedal portion; whereby the clutch will be disengaged and the yielding means will cause the first clutch member to close the valve; the continuing movement of the brake arm applying the brake.

3. In a combined brake and accelerator for vehicles; a shaft; a clutch member rotatable on the shaft and being operatively connected to the throttle valve of an engine; yielding means for urging the clutch member into a position for closing the valve; a second clutch member rotatable on the shaft and normally engaging with the first clutch member; a single articulated pedal having an upper portion hinged to a lower portion; a brake arm rotatable on the shaft and supporting the lower pedal portion; a vehicle brake operatively connected to the arm; means connecting the upper pedal portion with the second clutch member for actuating the member when the upper pedal portion is swung about its hinge; whereby the first clutch member will open the throttle valve to the desired extent; the brake arm lying in the path and being contacted and swung by the upper pedal portion when this portion is moved beyond a predetermined point; and means carried by the shaft and connecting the brake arm with the second clutch member for disengaging this member from the first clutch member during the initial movement of the brake arm caused by the excessive movement of the upper pedal portion; whereby the clutch will be disengaged and the yielding means will cause the first clutch member to close the valve; the continuing movement of the brake arm applying the brake.

4. In a combined brake and accelerator for vehicles; a shaft; a clutch member rotatable on the shaft and being operatively connected to the throttle valve of an engine; yielding means for urging the clutch member into a position for closing the valve; a second clutch member rotatable on the shaft and normally engaging the first clutch member; the second clutch member having an "acceleration" groove therein and a "braking" groove, these grooves lying in spaced-apart planes that extend at right angles to the shaft axis; the second clutch member having a cam groove interconnecting the adjacent ends of the other two grooves, and having a second cam groove leading from the other end of the "acceleration" groove to the "braking" groove; a brake arm mounted on the shaft and having a cam roller adapted to move along the grooves, the roller normally lying at the end of the accelerator groove that is joined by the first mentioned cam groove; a cam for shifting the brake arm along the shaft during the initial swinging of the brake arm for moving the roller from the "accelerator" groove into the first cam groove; further movement of the brake arm causing the roller to swing circumferentially around the shaft and move along the first cam groove into the "braking" groove; the moving of the roller along the first cam groove moving the second clutch member out of engagement with the first clutch member; and a vehicle brake operatively connected to the brake arm and applying the brakes to the vehicle when the arm is swung and the roller moves along the "braking" groove.

5. In a combined brake and accelerator for vehicles; a shaft; a clutch member rotatable on the shaft and being operatively connected to the throttle valve of an engine; yielding means for urging the clutch member into a position for closing the valve; a second clutch member rotatable on the shaft and normally engaging the first clutch member; the second clutch member having an "acceleration" groove therein and a "braking" groove, these grooves lying in spaced-apart planes that extend at right angles to the shaft axis; the second clutch member having a cam groove interconnecting the adjacent ends of the other two grooves, and having a second cam groove leading from the other end of the "acceleration" groove to the "braking" groove; a brake arm mounted on the shaft and having a cam roller adapted to move along the grooves, the roller normally lying at the end of the accelerator groove that is joined by the first mentioned cam groove; said second clutch member having a gear; a second gear meshing therewith; an accelerator arm connected to the second gear for rotating it for opening the valve; the rotation of the second clutch member caused by the first gear, moving the "acceleration" groove with respect to the roller.

6. In a combined brake and accelerator for vehicles; a shaft; a clutch member rotatable on the shaft and being operatively connected to the throttle valve of an engine; yielding means for urging the clutch member into a position for closing the valve; a second clutch member rotatable on the shaft and normally engaging the first clutch member; the second clutch member having an "acceleration" groove therein and a "braking" groove, these grooves lying in spaced-apart planes that extend at right angles to the shaft axis; the second clutch member having a cam groove interconnecting the adjacent ends of the other two grooves, and having a second cam groove leading from the other end of the "acceleration" groove to the "braking" groove; a brake arm mounted on the shaft and having a cam roller adapted to move along the grooves, the roller normally lying at the end of the accelerator groove that is joined by the first mentioned cam groove; said second clutch member having a gear; a second gear meshing therewith; an accelerator arm connected to the second gear for rotating it for opening the valve; the rotation of the second clutch member caused by the first gear, moving the "acceleration" groove with respect to the roller; a single articulated pedal having an upper portion hinged to a lower portion; connections between the upper pedal portion and the accelerator arm for swinging the arm when the upper pedal portion is swung about its hinge; the brake arm lying in the path and being contacted and swung by the upper pedal portion when this portion is moved beyond a predetermined point; the swinging of the brake arm causing the roller to move along the "accelerator" groove into the second cam groove for causing the second clutch member to be disengaged from the first clutch member and permit the yielding means to rotate the first clutch member for closing the valve; the continued movement of the accelerator arm rotating the second clutch member in a direction opposite to that taken by the roller; and the further movement of the brake arm causing the vehicle brake to be applied.

References Cited in the file of this patent
UNITED STATES PATENTS

| Number | Name | Date |
|---|---|---|
| 1,711,712 | Yost | May 7, 1929 |
| 2,021,859 | Jarvis | Nov. 19, 1935 |
| 2,125,952 | Perry | Aug. 9, 1938 |
| 2,279,458 | Harkness | Apr. 14, 1942 |
| 2,281,755 | Dunning | May 5, 1942 |
| 2,321,614 | Palmer | June 15, 1943 |
| 2,547,593 | Morris | Apr. 3, 1951 |
| 2,553,080 | Ching | May 15, 1951 |